United States Patent [19]

Berthiaume

[11] 4,233,546

[45] Nov. 11, 1980

[54] STROBOSCOPIC BEACONS FED FROM A CAPACITIVE SOURCE

[75] Inventor: Raymond Berthiaume, Ste-Julie, Canada

[73] Assignee: Hydro-Quebec, Quebec, Canada

[21] Appl. No.: 943,476

[22] Filed: Sep. 18, 1978

[30] Foreign Application Priority Data

Apr. 26, 1978 [CA] Canada .................... 302066

[51] Int. Cl.² ........................................ H05B 41/34
[52] U.S. Cl. ............................ 315/241 R; 307/109;
315/159; 315/200 A; 340/28; 340/333
[58] Field of Search ............... 315/227 R, 241 R, 307;
315/159, 200 A; 307/109, 151; 340/25, 28, 77,
331, 333

[56] References Cited

U.S. PATENT DOCUMENTS

| | | | |
|---|---|---|---|
| 2,891,195 | 6/1959 | Smyth | 315/200 A X |
| 3,202,963 | 8/1965 | Flynn et al. | 340/25 X |
| 3,259,762 | 7/1966 | Skuderna | 307/109 |
| 3,421,027 | 1/1969 | Maynard et al. | 307/293 |
| 3,426,263 | 2/1969 | Hennigan et al. | 320/23 |
| 3,430,101 | 2/1969 | Biltz | 315/194 |
| 3,678,371 | 7/1972 | Nuckolls | 323/6 |
| 3,749,976 | 7/1973 | Colyn | 315/241 R |
| 3,781,690 | 12/1973 | Corson | 328/67 |
| 3,944,909 | 3/1976 | Reymond | 323/45 |
| 4,037,191 | 7/1977 | Deane et al. | 340/28 |

*Primary Examiner*—Eugene R. LaRoche
*Attorney, Agent, or Firm*—Schwartz, Jeffery, Schwaab, Mack, Blumenthal & Koch

[57] ABSTRACT

The present invention relates to a system for energizing flash-tubes of beacons by means of the capacitive energy extracted from an insulated section of the overhead wire of power transmission lines. The supply system comprises a circuit for transforming the AC capacitive energy from the overhead wire into DC voltage, the latter feeding at least one flash-tube and a regulation circuit shunted across the transforming circuit for controlling a DC voltage threshold value supplying the tubes. Such regulation is achieved by detecting the predetermined DC voltage threshold value across the lamp terminals and by switching to the earth any capacitive energy extracted from the overhead wire exceeding that threshold value. Moreover, a circuit delivers a pulse at predetermined time intervals to control the firing of each flash-tube when the latter is subjected to a DC voltage corresponding to the predetermined threshold value and regulated by shunt switching.

15 Claims, 2 Drawing Figures

STROBOSCOPIC BEACONS FED FROM A CAPACITIVE SOURCE

BACKGROUND OF THE INVENTION

The present invention is directed to the supply in power of flash-tubes in stroboscopic beacons, from a capacitive source, and relates more particularly to a system for feeding those flash-tubes with the energy extracted from the overhead wire of high AC power lines.

Hitherto, the stroboscopic beacons used for indicating the presence of towers supporting the bundles of conductors of high voltage transmission lines were supplied either by means of a secondary supply line from a substation, or by means of engine-driven generators. However, either one of those feeding methods present severe economic and technical disadvantages in terms of installation cost and maintenance in addition of being of a low reliability as a source of constant supply.

A prime object of the present invention resides in using the energy induced in an overhead wire through its capacitive coupling with the conductors of a high AC voltage transmission line. The overhead wire is that conductor hung at the peak of the towers and which serves mainly to protect the bundles of conductors against lightnings. That overhead wire is not therefore usually utilized for conveying energy but whenever a given section thereof is insulated energy is being inducted therein through capacitive coupling by the underlying conductors. The overhead wire may then constitute a source of capacitive energy. By recovering that energy induced in the overhead wire, the above-mentioned inconveniences inherent to the conventional supply sources are effectively avoided and its use additionally provides an economical and reliable supply source immediately usable at the desired area, the latter advantage being particularly sound in view of the remoteness of the transmission lines from the local distribution substations.

SUMMARY OF THE INVENTION

More specifically, the present invention concerns a system for feeding the flash-tubes of stroboscopic beacons by means of the overhead wire of an AC voltage transmission line. The system comprises means for transforming the AC capacitive energy into a DC voltage for supplying at least one flash-tube; regulation means coupled in shunt with the transforming means for controlling the supply in DC voltage to said flash-tubes; and means for generating a pulse at a predetermined frequency for firing said flash-tube when under said DC voltage regulated by said regulation means.

The present invention also resides in a method for feeding the flash-tubes of stroboscopic beacons carried out by the above system.

BRIEF DESCRIPTION OF THE DRAWINGS

A preferred embodiment of the present invention will be hereinafter described with reference to the accompanying drawings, wherein.

DETAILED DESCRIPTION OF A PREFERRED EMBODIMENT

Figure 1:
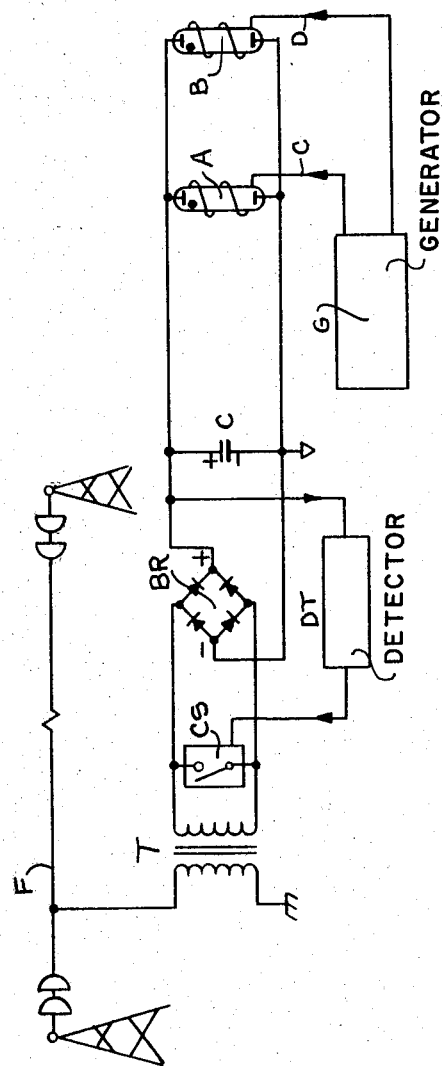
FIG. 1 schematically illustrates the system for feeding flash-tubes by means of the capacitive energy extracted from an overhead wire.

The arrangement illustrated in FIG. 1 shows a voltage step-down transformer T having its primary windings connected between an insulated section of the overhead wire F and ground. A device P mounted across the primary windings of transformer T insures the carry-on of the normal function of overhead wire F as a lightning arrester. The AC voltage developed across the secondary terminals of a transformer T is rectified through a diode rectifying bridge BR which charges in DC voltage a capacitor C feeding two flash-tubes A and B respectively connected in parallel. A detector circuit DT controls the closing of switch CS mounted across the secondary winding terminals of transformer T, when the voltage across the terminals of capacitor C reaches a predetermined threshold value. The closing of the shunt switch CS result in the short-circuiting of the secondary of transformer T, thereby by-passing to ground the excess of energy extracted from the overhead wire F.

In addition, a generator G delivers at a predetermined frequency a signal for energizing flash-tubes A or B through lead C or D, respectively. The firing signal is in fact a high voltage pulse, but of short duration, which is applied to the trigger wire of the flash-tubes, that pulse ionizing the gas, usually xenon, contained in the flash-tubes. Such ionization then causes a substantial decrease in the internal resistance of the flash-tube, resulting in the steep discharge of capacitor C through the tubes, to produce the desired flash. Generator G determines not only the frequency at which the trigger pulse is generated, but also controls the duration of that pulse.

Thereafter, capacitor C being discharged, the detector circuit DT changes state and allows the opening of the shunt switch CS, which results in the recharge of capacitor C through the diode bridge BR.

It is to be noted that the charging time of capacitor C is less than the time interval between the instants of generation of the trigger pulses by the generator G.

Figure 2:
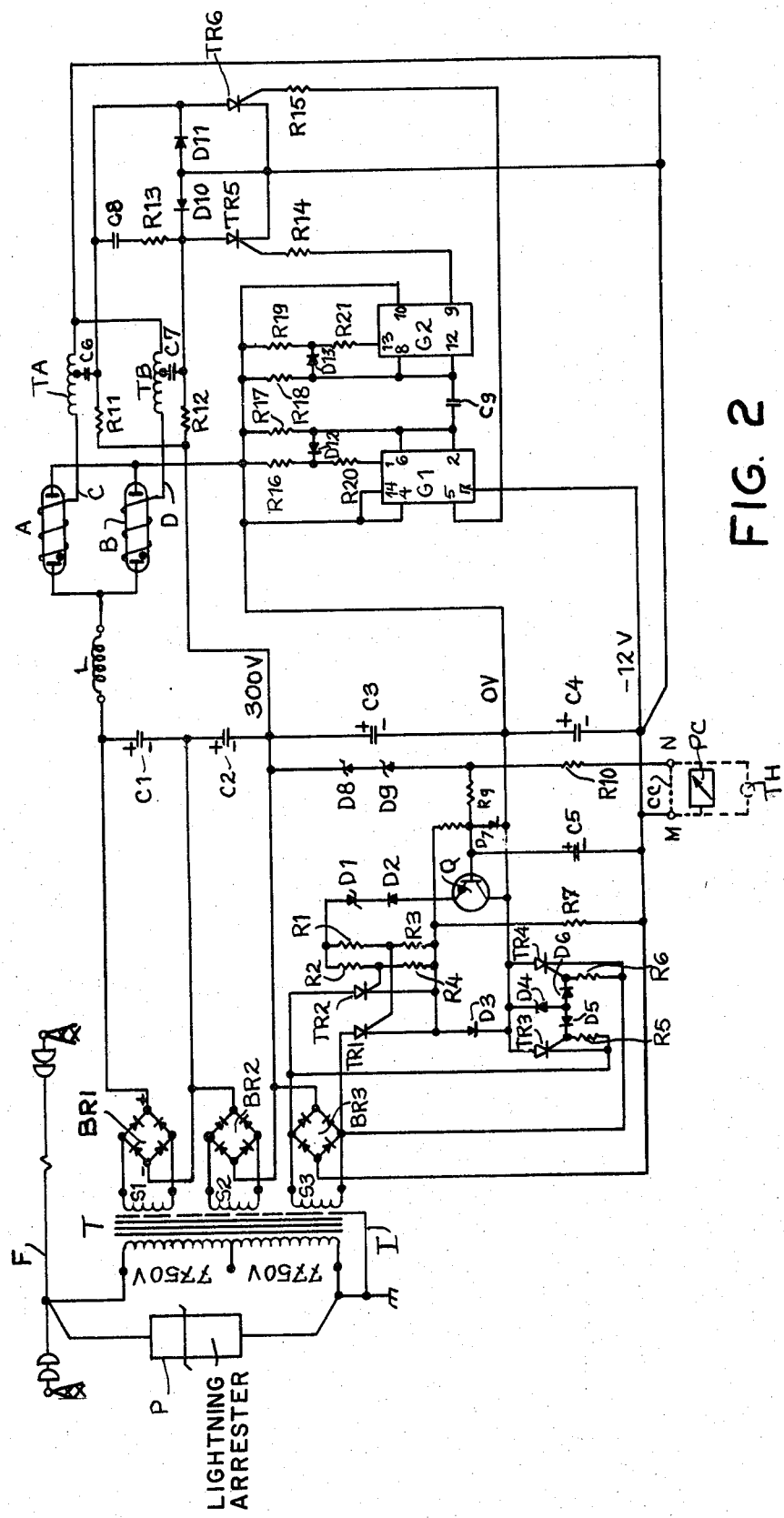
FIG. 2 shows a detailed diagram of the feeding system of FIG. 1.

FIG. 2 shows a detailed embodiment of the feeding system of FIG. 1. The voltage step-down transformer T has its primary windings connected between the insulated section of the overhead wire F and ground and includes three secondary windings S1, S2 and S3 protected against over-voltages by an insulating screen I. Each secondary winding is connected to a diode rectifying bridge BR1, BR2 and BR3, respectively, which deliver the DC voltage necessary to charge the bank of capacitors C1, C2, C3 and C4. Capacitors C1, C2 and C3 supply the flash-tubes A and B with DC voltage whereas capacitor C4 acts as a supply source to the trigger signal generators G1 and G2 controlling the triggering time of flash-tubes A and B. Moreover, the voltage across capacitor C3 terminals is detected by means of the detector circuit mainly formed by transistor Q, the latter being rendered conductive when capacitor C3 is at full charge. Transistor Q being conductive, thyristors TR1 and TR2 are fired and thus rendered conductive to short-circuit the terminals of the secondary winding S3. The shunting of winding S3 results in the supply of a nul power to the other windings S1 and S2 so that the energy then extracted from the overhead wire F is completely delivered to ground through the primary winding of transformer T. The subsequent discharge of capacitor C3 through the flash-tubes drives transistor Q in its non-conductive state, thereby cancelling the short-circuit between the terminals of the secondary windings of the transformer.

At the beginning, capacitors C1, C2, C3 and C4 are charged up to the required operating voltage and transistor Q is polarized in its conduction state by means of resistances R9 and R10 through the protection zener diodes D8 and D9. Transistor Q being conductive, a current flows through diodes D1 and D2 and the voltage dividers R1, R3 and R2, R4 to energize the trigger electrode of thyristors TR1, TR2, respectively. Resistance R7, capacitor C5 and diode D7 act as protection elements for transistor Q. Then, the conduction controlled thyristors TR3 and TR4 become conductive, these thyristors having their respective trigger electrode being polarized by resistances R5 and R6 to which are connected to blocking and protection diodes D4, D5 and D6. The turning-on of thyristors TR1, TR2, TR3 and TR4 causes the short-circuit across the diode bridge BR3 and therefore across the secondary windings of transformer T. The secondary of transformer T being shunted, the supply of the bank of capacitors C1, C2 and C3 in DC voltage is stopped, these being then loaded at the desired voltage level. In the present case, the voltage so-developed between the anode and cathode of the flash-tubes A and B is at approximately 900 vDC.

The pulse generators G1 and G2, of the monostable type, govern the triggering time of flash-tubes A and B, respectively. Those generators are energized by capacitor C4 and polarized by resistances R16, R17, R20 and diode D12, for generator G1, and by resistances R18, R19, R21 and doide D13, for generator G2. An integration capacitor C9 is also provided between the two generators. Generator G1 delivers, at a predetermined frequency and through resistance R15, a signal for firing thyristor TR6 which then becomes conductive to establish a short-circuit across the terminals of triggering transformer TA and capacitor C6 connected in series with the flash-tube A. A high voltage pulse is then generated through the trigger wire C, causing the ionization of the gas in the flash-tube A and so the steep discharge of the bank of capacitors C1, C2 and C3 through the inductance L, the anode and the cathode of the flash-tube A. Such a discharge produces a flash of bright light from the flash-tube A. The time constant of the circuit formed by capacitor C6 and the inductance of winding TA determine the duration of the triggering pulse flowing through the wire C.

Similarly, generator G2 allows the flashing of the flash-tube B, at a predetermined frequency, by delivering a firing signal to thyristor TR5 through resistance R14 to cause a short-circuit across the terminals of the trigger transformer TB and the capacitor C7 both mounted in series. That short-circuit causes the steep discharge of capacitor C7 through the trigger wire D of the flash-tube B wherein the gas is then ionized to allow the actual discharge of the bank of capacitors C1, C2 and C3 through the inductance L, the anode and the cathode of the tube B. The time constant determined by the circuit formed by capacitor C7 and the inductance of TB determines the duration of the pulse flowing through the trigger wire D.

In the shown arrangement, diodes D10 and D11 operate as blocking and protecting elements for thyristors TR5 and TR6 whereas the smoothing coil L prevents a too high current from flowing through the flash-tubes A and B.

Moreover, there are provided a photo-electric cell PC and/or a thermostat TH across terminals M-N to ensure operation of the flash-tubes by daytime only or when the surrounding temperature reaches such a low value as to damage the flash-tubes. In any case, the continuous operation of the flash-tubes of the beacon is achieved in short-circuiting terminals M and N by means of the connecting lead CC.

It is understood that modifications may be drawn to the above-described embodiments without departing from the gist of the feeding system in accordance with the present invention the scope of which is solely limited by the claims which follow.

I claim:

1. A system for feeding flash-tubes of beacons with the capacitive energy extracted from an insulated section of an overhead wire of an AC power transmission line, comprising:
   means for transforming said capacitive energy from the overhead wire into a DC voltage to feed at least one of said flash tubes;
   regulation means coupled in shunt to said transforming means for controlling the DC voltage supply to said flash-tubes, regulation means comprising a switching circuit for relating said DC voltage according to a predetermined value and a detection circuit operative to control actuation of said switching circuit when said predetermined DC voltage value is reached; and
   means for generating at a predetermined frequency pulses for firing said at least one flash-tube when said flash-tube is under said DC voltage regulated by said regulation means.

2. A feeding system as claimed in claim 1, wherein said transforming means comprise at least one capacitive element connected across the terminals of said flash-tubes and at least one circuit for rectifying the AC energy into said DC voltage so as to charge said capacitive element at a voltage corresponding to a rated DC voltage of said flash-tube.

3. A feeding system as claimed in claim 2, wherein there is further provided a transformer interconnected between said rectifying circuit and said overhead wire.

4. A feeding system as claimed in claim 1, wherein said generating means comprise means fed by said transforming means for delivering said pulses initiating actuation of said flash-tube.

5. A feeding system as claimed in claim 1 wherein said transforming means comprise a transformer having primary windings connected between said overhead wire and ground, and secondary windings, and wherein there are further provided voltage rectifying circuits each connected to one of said secondary windings and a bank of capacitors are respectively fed with said DC voltage by said rectifying circuits.

6. A feeding system as claimed in claim 1 or 5, wherein a photosensitive element is further included, said photosensitive element controlling the operation time of said regulation means.

7. A feeding system as claimed in claim 1 or 5, wherein a thermosensitive element is provided, said thermosensitive element controlling the operation time of said regulation means.

8. A feeding system as claimed in claims 1 or 5, wherein there is further provided a lightning arrester mounted between the insulated section of the overhead wire and ground, in shunt with said transforming means.

9. A feeding system as claimed in claim 5, wherein there is further provided a switching circuit connected across one of said secondary windings and said regulation means comprise a detection circuit controlling actuation of said switching circuit when the DC voltage across the terminals of one of said capacitors of the bank reaches a predetermined threshold value.

10. A feeding system as claimed in claim 9, wherein said detection circuit is transistorized and said switching circuit comprises conduction controlled thyristors.

11. A feeding system as claimed in claim 9, further including a smoothing inductance connected between one terminal of said flash-tube and said bank of capacitors.

12. A feeding system as claimed in claim 9, wherein said generating means comprise a monostable circuit for each flash-tube, said monostable circuit delivering a pulse for firing a conduction controlled thyristor governing actuation time of a trigger circuit controlling the actuation of the flash-tube.

13. A method of feeding flash-tubes of beacons with a capacitive energy source supplied by a section of an overhead wire of an AC power transmission line, said method comprising the steps of: insulating against ground said overhead wire section; extracting the AC energy generated by said overhead wire section; transforming said AC energy into DC voltage for feeding at least one of said flash-tubes; detecting the value of said DC voltage supplied to each flash-tube; shorting to ground said energy from the overhead wire through a shunt switching circuit when said DC voltage value reaches a predetermined threshold value; and firing each flash-tube under said predetermined DC voltage threshold value by means of a corresponding pulse generating circuit.

14. A feeding method as claimed in claim 13, wherein said transformation step includes the steps of rectifying the AC voltage of said capacitive energy from the overhead wire and charging a bank of capacitors with DC voltage.

15. A feeding method as claimed in claim 14, wherein said detecting step includes detecting the DC voltage threshold value across the terminals of one of said capacitors of said bank where the charging time of said capacitors is less than the frequency at which trigger pulses are generated by each pulse generating circuit.

* * * * *